H. L. SMITH.
CORN HUSKING MACHINE.
APPLICATION FILED APR. 27, 1921.
1,417,356.
Patented May 23, 1922.
2 SHEETS—SHEET 1.
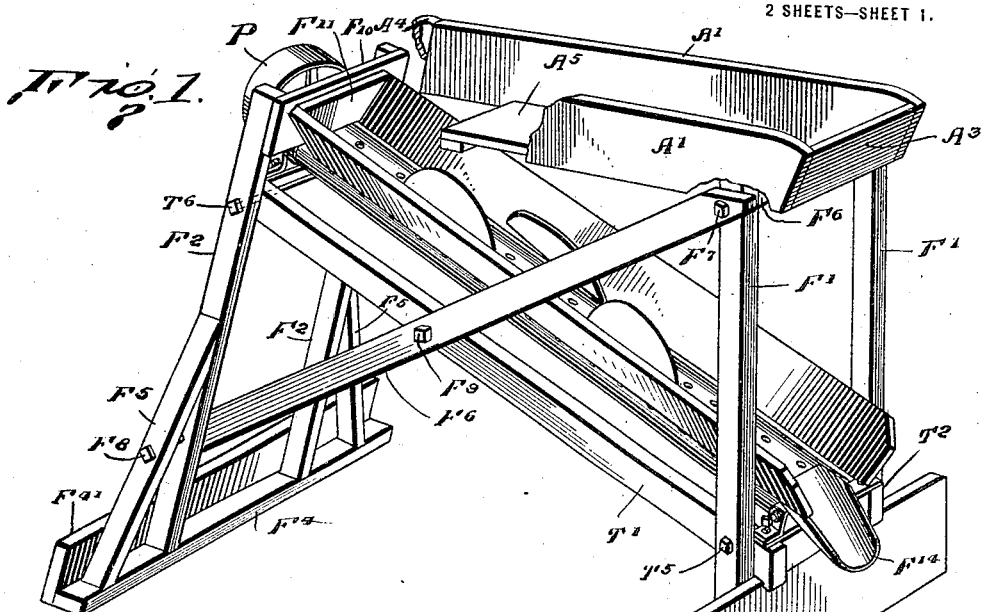
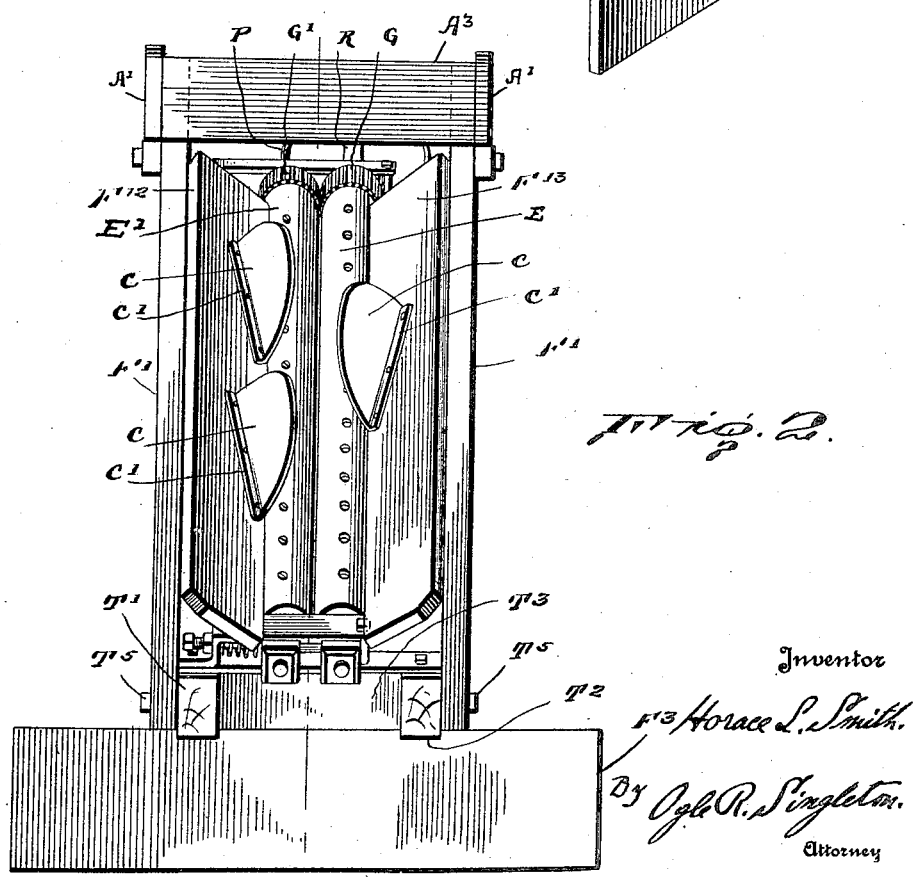
Inventor
Horace L. Smith.
By Ogle R. Singleton.
Attorney

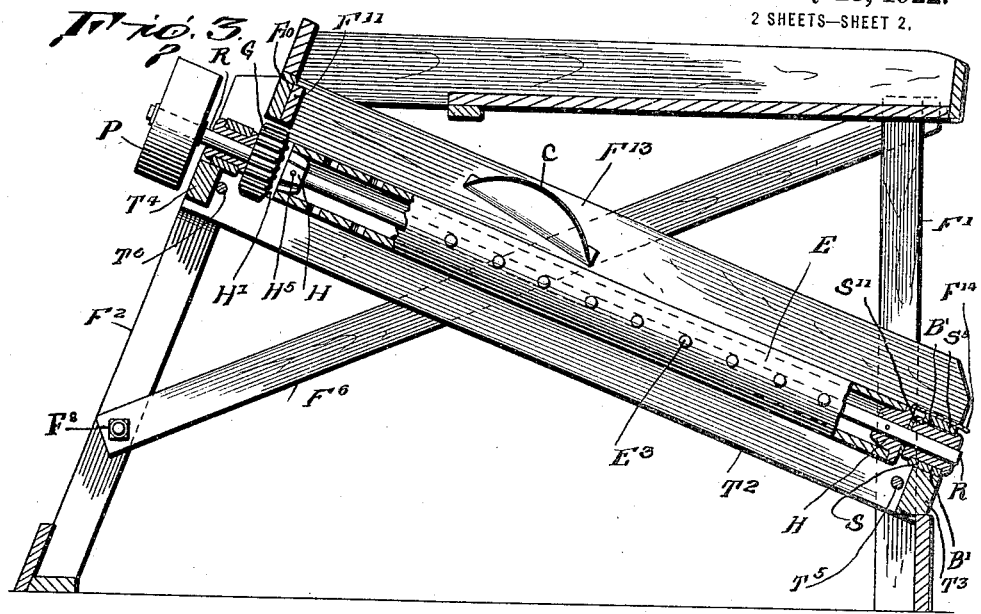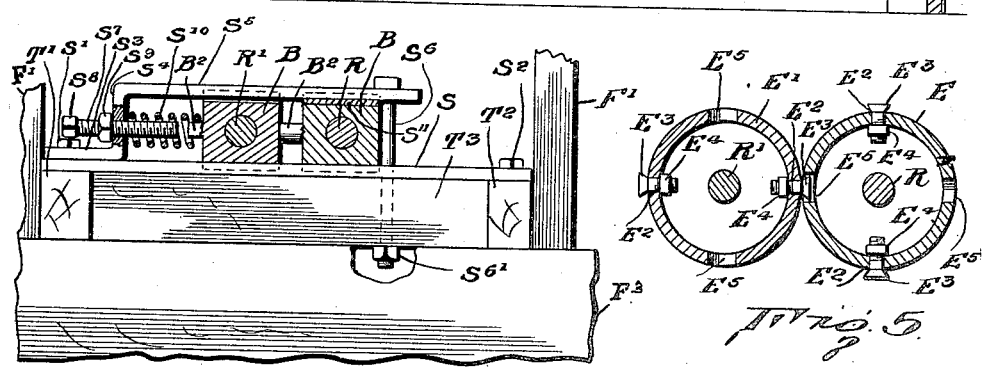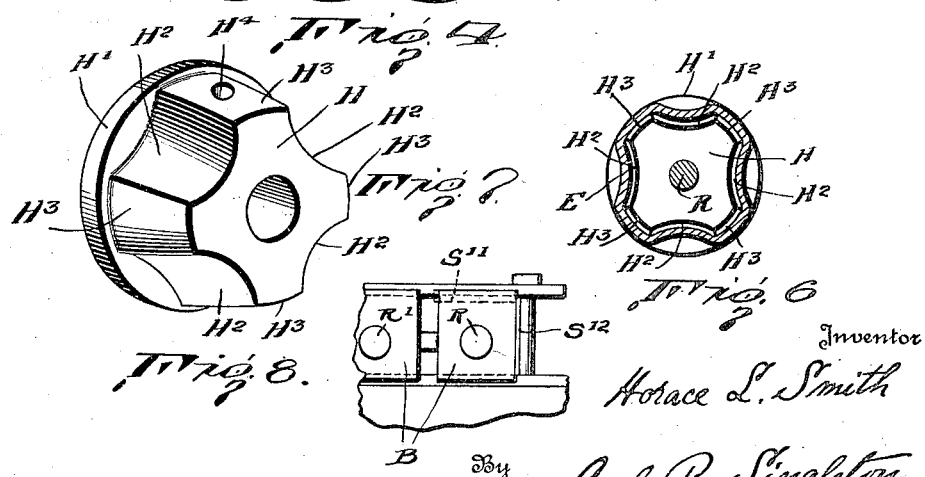

UNITED STATES PATENT OFFICE.

HORACE L. SMITH, OF PRINCE GEORGE COUNTY, VIRGINIA.

CORN-HUSKING MACHINE.

1,417,356.    Specification of Letters Patent.    Patented May 23, 1922.

Application filed April 27, 1921. Serial No. 464,774.

*To all whom it may concern:*

Be it known that I, HORACE L. SMITH, a citizen of the United States, residing in Prince George County and State of Virginia, have invented certain new and useful Improvements in Corn-Husking Machines, of which the following is a specification.

My invention consists in a new and useful improvement in corn husking machines, and is designed to provide a corn husker that is stable, compact and durable, and at the same time simple and effective in operation.

A novel feature of my device is the form of the hubs by which the husking rolls are supported upon their shafts. These hubs have a peculiar form which adapts them to receive thereon hollow husking rolls of slightly varying interior diameters.

Another novel feature of my device is the form and method of applying the husking pins. The pins are in the form of ordinary bolts and are passed through openings in the husking rolls and so positioned as to allow their heads to project slightly beyond the peripheries of the rolls. The pins are locked in position by nuts applied thereon within the rolls. The obvious advantages of this form of husking pin are its cheapness and simplicity. The pin can easily be readjusted so as to present different edges of its head for the work of husking, and it may be easily removed and replaced.

Another novel feature of my device is the form and application to the device of the corn ear controllers. These controllers comprise a series of guide plates which are disposed over the husking rolls and serve to direct the corn ears to said rolls in a manner most advantageous to the husking operation. These plates are semi-cardioid in shape with their straight edges applied to the sides of the corn ear trough, so that they have no angular portions to obstruct the passage of the corn ears, and they are so positioned relative to the trough as to tend to draw the corn ears longitudinally of the trough and downwardly into contact with the husking rolls.

The foregoing novel and useful features of my invention are embodied in the details of construction illustrated in the drawings and hereinafter fully described, but I do not consider my invention limited to the specific embodiment herein set forth and refer for its scope to the claims appended hereto.

In the drawings:

Fig. 1 is a general perspective view of my improved husker, showing part of the table broken away.

Fig. 2 is a front elevation of my husker.

Fig. 3 is a longitudinal sectional view.

Fig. 4 is a detailed view, partly in section, showing the journal boxes and mounting therefor.

Fig. 5 is a vertical sectional view of the husking rolls.

Fig. 6 is an end elevation of one of the roll hubs, indicating the roll thereon in section.

Fig. 7 is a general perspective view of one of the hubs.

Fig. 8 is a detailed view indicating the method of adjustment of the journal boxes.

My improved corn husking device is mounted in a frame comprising the vertically disposed front legs $F^1$, $F^1$ and the slantingly disposed rear legs $F^2$, $F^2$. The front legs $F^1$, $F^1$ are connected by the base board $F^3$, and the rear legs $F^2$, $F^2$, which slant toward the front of the device, are mounted upon a supporting timber $F^4$, having the base board $F^{4'}$. Braces $F^5$, $F^5$ are disposed between the supporting timber $F^4$ and the legs $F^2$, $F^2$. The legs $F^1$, $F^1$ and the legs $F^2$, $F^2$ are joined by the braces $F^6$, $F^6$, which are slantingly disposed between the upper ends of the legs $F^1$, $F^1$ and the lower ends of the legs $F^2$, $F^2$. Bolts $F^8$, $F^8$ serve to pin the legs $F^2$, $F^2$, braces $F^5$, $F^5$, and braces $F^6$, $F^6$ together. Bolts $F^7$, $F^7$ serve to pin the braces $F^6$, $F^6$ to the legs $F^1$, $F^1$.

The operative mechanism of my corn husker is secured to a solid and extremely compact rectangular foundation, comprising the longitudinal timbers $T^1$ and $T^2$ and the transverse timbers $T^3$ and $T^4$. The front ends of the timbers $T^1$ and $T^2$ rest upon the top edge of the base board $F^3$ and on the inner sides of the legs $F^1$, $F^1$. A bolt $T^5$ transfixes the legs $F^1$, $F^1$ and the timbers $T^1$ and $T^2$ and serves to confine the timber $T^3$ between the front ends of the timbers $T^1$ and $T^2$. The rear ends of the timbers $T^1$ and $T^2$ are supported adjacent the upper ends of the rear legs $F^2$, $F^2$ by means of the bolt $T^6$ which transfixes the legs $F^2$, $F^2$ and the timbers $T^1$ and $T^2$, and serves to confine the timber $T^4$ between the rear ends of the timbers $T^1$ and $T^2$. Bolts $F^9$, $F^9$ serve to pin the timbers $T^1$ and $T^2$ to the braces $F^6$, $F^6$ at the points where said timbers and said braces cross.

From the foregoing description of the frame and foundation for my device, it will be obvious that I have provided an extremely strong and stable supporting means which is capable of sustaining the considerable weight of the operative mechanism, and also the stresses and strains incident to its use. It is to be noted that the pinning of the braces and timbers affords an admirable means to supply the requisite degree of rigidity to the supporting means.

Upon the upper edge of the transverse timber $T^3$ and the adjacent ends of the timbers $T^1$ and $T^2$, is located the strap S, bolted to the timber $T^1$ by the bolt $S^1$ and to the timber $T^2$ by the bolt $S^2$. Between the head of the bolt $S^1$ and the strap S there is confined a second strap $S^3$ which is provided with the upwardly bent portion $S^4$ and the horizontally disposed portion $S^5$ which is located parallel with and directly above the strap S. A bolt $S^6$ passes through the outer end of the strap $S^3$ and also through the strap S and the timber $T^3$, and a nut $S^{6'}$ thereon serves to hold the strap $S^3$ in adjusted position. Mounted in the housing thus formed by the straps S and $S^3$, are the two journal boxes B, B provided with the recesses $B^1$, $B^1$ upon their bottom and top faces for the reception therein of the straps S and $S^3$ respectively. Each box B is provided with a boss $B^2$ located at the center of one of its vertical faces, and when the boxes B, B are placed in operative position their bosses $B^2$, $B^2$ are disposed toward the upwardly bent portion $S^4$ of the strap $S^3$. The boss $B^2$ located between the two boxes B, B serves to space the boxes B, B for a purpose presently explained. Tapped through the upwardly bent portion $S^4$ of the strap $S^3$ and disposed in line with the boss $B^2$ of the box B adjacent thereto, is the machined bolt $S^7$ having the head $S^8$ and the lock-nut $S^9$. By the adjustment of this bolt $S^7$ the distance between its end and the boss $B^2$ may be regulated and thus the degree of longitudinal movement of the journal box adjacent the bolt $S^7$ determined. Strung upon the bolt $S^7$ and its adjacent boss $B^2$ is the spring $S^{10}$ adapted to be compressed between the upwardly bent portion $S^4$ and the box B to permit longitudinal movement of the box B. Between the strap $S^3$ and the box B adjacent the bolt $S^6$, there is interposed a shim $S^{11}$ so that when the bolt $S^6$ is locked in place by the nut $S^{6'}$, the box B adjacent thereto will be rigidly locked in position while its accompanying box B will be permitted longitudinal movement between the fixed box B and the end of the bolt $S^7$. By interposing a shim or shims $S^{12}$ between the bolt $S^6$ and its adjacent box B, both boxes B, B may be positioned at greater proximity to the upwardly bent portion $S^4$ and thus greater compression exerted upon the spring $S^{10}$. This adjustment is expedient should the spring $S^{10}$ lose some of its resiliency through constant use.

It is to be understood that the foregoing details of construction, adapted to provide journals for the shafts of the husking rolls and located at the front end of the device, are duplicated at the rear end of the device, being located above the transverse timber $T^4$.

Thus upon each of the straps S at the front and rear of the device are the two journal boxes B, B. Journaled in these boxes B, are the shafts R and $R^1$. Upon these shafts R and $R^1$ are mounted hubs H of a new and useful form, each shaft having two hubs H, H mounted thereon at points on the shaft between the two journal boxes B, B carrying the shaft and closely adjacent said boxes B, B. These hubs H are frusto-conoidal in form and provided on their bases with circular plates $H^1$ of a diameter slightly larger than the hubs H. Each hub H is provided on its circumference with four symmetrically disposed concavities $H^2$ which thus provide the four convex shoulders $H^3$. A bore $H^4$ transfixes each hub H on a diameter passing through two of the shoulders $H^3$.

Mounted upon the hubs H are the tubular husking rolls E and $E^1$. The roll E is mounted on the hubs H, H on shaft R and the roll $E^1$ is mounted on the hubs H, H on shaft $R^1$. The journal boxes B, carrying the shafts R and $R^1$ are so spaced by the bosses $B^2$ that when the rolls E and $E^1$ are mounted their peripheries are tangentially disposed.

The peculiar form of the hubs H make them particularly well adapted to receive the husking rolls E and $E^1$. The frusto-conoidal shape of each hub H makes it possible to expand the roll to accommodate the hub H should the roll be normally of slightly less diameter than the hub H. The concavities $H^2$ make it possible to crimp the roll upon the hub H should the roll be normally of slightly greater diameter than the hub H (see Fig. 6). Thus it will be obvious that the hubs H are designed to receive thereon husking rolls of slightly varying diameters, and in such manner that the axes of the rolls and hubs will always coincide when the rolls are so received.

When the hub H is positioned in the roll, the plate $H^1$ forms a shoulder to receive the end of the roll thereagainst. A pin $H^5$, passing through the roll, bore $H^4$ in the hub H, and the shaft on which the hub H is mounted, fastens the roll and hub fixedly upon the shaft.

Each roll E and $E^1$ is provided with two diametrically disposed longitudinal rows of holes $E^2$, through each one of which is disposed a husking pin $E^3$ which is in the form of an ordinary bolt having a slotted flattened head which extends beyond the periphery of the roll. A nut $E^4$ applied to the pin $E^3$ within the roll locks the pin upon the roll. The concavity of the roll serves to lock the nut $E^4$ upon the pin $E^3$. Each roll E and $E^1$ is also provided with two diametrically disposed longitudinal rows of holes $E^5$ so disposed relative to the rows of holes $E^2$ in the other roll that the heads of the pins $E^3$ will be received into the holes $E^5$ when the rolls E and $E^1$ revolve.

Upon the rear ends of the shafts R and $R^1$, between the hubs H, H and the journal boxes B, B, are mounted the intermeshing gears G and $G^1$ respectively. These gears G and $G^1$ may be made integral with the adjacent hubs H, H. Upon the end of the shaft R extending behind the journal box B and the rear end of the device, is mounted a pulley P for driving the rolls E and $E^1$. Connecting the upper ends of the rear legs $F^2$, $F^2$, above the gears G and $G^1$, is the board $F^{10}$ to which is attached the board $F^{11}$ which forms the rear end closure for the open-bottom trough formed by the side boards $F^{12}$ and $F^{13}$ which are disposed above the rolls E and $E^1$. At its front end this trough is supplied with a spout $F^{14}$ covering the journal boxes B, B at the front of the device.

The side boards $F^{12}$ and $F^{13}$ are provided with the corn ear controllers which comprise light sheet-metal plates C, semi-cardioid in shape. Each plate C is provided upon its straight edge with a right-angular flange $C^1$ by which the plate C is attached to the side board. One of these plates C is attached to the board $F^{13}$ at about its middle and two plates C, C are attached to the board $F^{12}$, one above and one below the other plate C. The plates are so located that their rear edges are higher above the rolls E and $E^1$ than their front edges, and their front edges are nearer the lower edges of the boards $F^{12}$ and $F^{13}$ adjacent the peripheries of the rolls E and $E^1$. Thus these plates C serve to guide the corn ears to the rolls E and $E^1$.

Resting upon the tops of the legs $F^1$, $F^1$ and $F^2$, $F^2$, is the removable feed table A, composed of the sides $A^1$, $A^1$, the front end $A^3$ and the rear end $A^4$, and the bottom $A^5$ which is spaced from the rear end $A^4$ so as to provide an opening in the table above the rear end of the rolls E and $E^1$.

From the foregoing description of the details of construction of the embodiment of my invention disclosed in the drawings, the operation of the device is obvious. Corn ears enclosed in the husks are placed upon the table A, and power being applied to the device by any suitable means through the pulley P, the husking rolls E and $E^1$ are caused to revolve by the intermeshing gears G and $G^1$. When the corn ears are pushed rearwardly upon the table A, they fall through the opening therein and are precipitated upon the rear ends of the revolving husking rolls E and $E^1$. By reason of the downwardly slanting position of the rolls E and $E^1$, the corn ears tend to move forwardly and are guided downwardly and pressed upon the husking rolls E and $E^1$ by the corn ear controllers C. The corn ears being thus pressed upon the rolls E and $E^1$, the husking pins $E^3$ are caused to bite into the husks upon the corn ears and strip the husks from the ears. The husks are carried by the action of the pins $E^3$, between the rolls E and $E^1$ and are allowed to fall below the rolls E and $E^1$. Should any husks adhere to the pins $E^3$ until the rotation of the rolls brings the pins $E^3$ upward, the husks would be stripped from the pins $E^3$ by the side boards $F^{12}$ or $F^{13}$ above the rolls E and $E^1$.

As has been pointed out, the lateral movement of the journal boxes B, B in which the shaft $R^1$ is journaled, permits the husking roll $E^1$ to move away from the husking roll E, to permit the husks to pass between the rolls E and $E^1$. The spring $S^{10}$ tends to yieldingly hold the rolls E and $E^1$ in contact. The adjustment of the bolt $S^7$ regulates the lateral movement of the roll $E^1$ to retain the gears G and $G^1$ constantly in mesh.

When the corn ears have traversed the trough above the husking rolls and have been husked in the process, they pass out of the device through the spout $F^{14}$ and are received in a receptacle which may be placed below the spout $F^{14}$ and adjacent the front of the device.

Having described my invention, what I claim is:

1. In a corn husker, the combination of husking rolls; a corn ear trough above said rolls; and a plurality of corn ear controllers comprising plates attached to said trough, each of said plates having a straight edge for attachment to the trough and a curved edge extending over the path of travel of the ears on said rolls.

2. In a corn husker, the combination of husking rolls; a corn ear trough above said rolls; and a plurality of corn ear controllers comprising plates attached to said trough, slightly inclined downwardly and forwardly toward the surface of said rolls.

3. In a corn husker, the combination of husking rolls; a corn ear trough above said rolls; and a plurality of corn ear controllers comprising plates having their upper parts nearer the vertical tangential plane of the rolls, and their lower parts further from said plane.

4. In a corn husker, co-acting husking rolls provided with husking pins locked in said rolls by means of nuts thereon, and openings in each roll adapted to receive the heads of said pins of the other roll therein, when said rolls are in operation, said nuts being accessible for operation through said openings.

5. In a corn husker, the combination of co-acting hollow husking rolls, each roll being provided with a series of bolt-holes and a series of openings to receive bolt-heads; bolts mounted in said rolls, having their shanks disposed through said bolt-holes; and nuts on the shanks of said bolts within said rolls, each bolt-hole being so related to an opening that the nut on its bolt may be operated by a tool introduced into the roll through its associated opening.

6. In a corn husker, the combination of a hollow husking roll; and a frusto-conoidal bearing hub upon which the end of said hollow roll is mounted, said hub being provided upon its periphery with a plurality of recesses.

In testimony whereof I affix my signature.

HORACE L. SMITH.